US010432567B2

(12) United States Patent
Cannata et al.

(10) Patent No.: US 10,432,567 B2
(45) Date of Patent: Oct. 1, 2019

(54) DISPLAY OF A NOTIFICATION THAT IDENTIFIES A KEYWORD

(71) Applicant: Nokia Technologies Oy, Espoo (FI)

(72) Inventors: Giovanni Cannata, London (GB); Rob Bartlett, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 381 days.

(21) Appl. No.: 15/308,433

(22) PCT Filed: May 6, 2015

(86) PCT No.: PCT/FI2015/050307
§ 371 (c)(1),
(2) Date: Nov. 2, 2016

(87) PCT Pub. No.: WO2015/173466
PCT Pub. Date: Nov. 19, 2015

(65) Prior Publication Data
US 2017/0078235 A1    Mar. 16, 2017

(30) Foreign Application Priority Data
May 15, 2014 (EP) ..................... 14168445

(51) Int. Cl.
H04L 12/58    (2006.01)
G06Q 10/10   (2012.01)
(52) U.S. Cl.
CPC .......... *H04L 51/24* (2013.01); *G06Q 10/107* (2013.01); *H04L 51/12* (2013.01); *H04L 51/36* (2013.01)

(58) Field of Classification Search
CPC ......... H04L 51/12; H04L 51/24; H04L 51/36; G06Q 10/107
USPC ....................................... 709/206
See application file for complete search history.

(56) References Cited

U.S. PATENT DOCUMENTS 7,260,605 B1    8/2007  Okada et al.
8,713,124 B1    4/2014  Weiss
2007/0150783 A1  6/2007  Hess
(Continued)

FOREIGN PATENT DOCUMENTS

JP   2009159527 A   7/2009
WO   2013/032619 A1  3/2013

OTHER PUBLICATIONS

EP Office Action received for corresponding European Patent Application No. 14168445.6, dated Feb. 20, 2017, 6 pages.
(Continued)

*Primary Examiner* — Tu T Nguyen
(74) *Attorney, Agent, or Firm* — Alston & Bird LLP

(57) ABSTRACT

A method comprising receiving a first message, receiving a second message, determining that the first message has an unread status, determining that the second message has an unread status, determining that at least one keyword is represented in the first message and the second message in response to the determination that the first message has an unread status and the determination that the second message has an unread status, determining a notification that identifies the keyword, signifies the receipt of the first message, and signifies the receipt of the second message, and causing display of the notification is disclosed.

20 Claims, 13 Drawing Sheets

(56) References Cited

U.S. PATENT DOCUMENTS

2007/0280457 A1* 12/2007 Aberethy .............. H04M 1/575
379/201.01
2012/0149342 A1   6/2012 Cohen et al.
2013/0346882 A1  12/2013 Shiplacoff et al.

OTHER PUBLICATIONS

Crispin, "Internet Message Access Protocol—Version 4rev1", RFC 3501, Network Working Group, Mar. 2003, pp. 1-108.
International Search Report and Written Opinion received for corresponding Patent Cooperation Treaty Application No. PCT/FI2015/050307, dated Oct. 8, 2015, 13 pages.
Extended European Search Report received for corresponding European Patent Application No. 14168445.6, dated Sep. 16, 2014, 5 pages.
Office action received for corresponding Mexican Patent Application No. MX/a/2016/014781, dated Jun. 21, 2018, 3 pages of office action and no page of translation available.
Notice of Allowance received for corresponding Japanese Patent Application No. 2016-566975, dated Jan. 10, 2018, 3 pages of Notice of Allowance and no page of translation available.

* cited by examiner

DISPLAY OF A NOTIFICATION THAT IDENTIFIES A KEYWORD

RELATED APPLICATION

This application was originally filed as Patent Cooperation Treaty Application No. PCT/FI2015/050307 filed May 6, 2015 which claims priority benefit to European Patent Application No. 14168445.6, filed May 15, 2014.

TECHNICAL FIELD

The present application relates generally to display of a notification that identifies a keyword represented in a message.

BACKGROUND

As electronic apparatuses become increasingly prevalent in our society, many users have become increasingly dependent on their electronic apparatus in daily life. For example, a user may desire to view messages by way of the user's electronic apparatus. As such, it may be desirable to configure an electronic apparatus such that a user of the electronic apparatus may view such messages in an intuitive manner.

SUMMARY

Various aspects of examples of the invention are set out in the claims.

One or more embodiments may provide an apparatus, a computer readable medium, a non-transitory computer readable medium, a computer program product, and/or a method for receiving a first message, receiving a second message, determining that the first message has an unread status, determining that the second message has an unread status, determining that at least one keyword is represented in the first message and the second message in response to the determination that the first message has an unread status and the determination that the second message has an unread status, determining a notification that identifies the keyword, signifies the receipt of the first message, and signifies the receipt of the second message, and causing display of the notification.

One or more embodiments may provide an apparatus, a computer readable medium, a computer program product, and/or a non-transitory computer readable medium having means for receiving a first message, means for receiving a second message, means for determining that the first message has an unread status, means for determining that the second message has an unread status, means for determining that at least one keyword is represented in the first message and the second message in response to the determination that the first message has an unread status and the determination that the second message has an unread status, means for determining a notification that identifies the keyword, signifies the receipt of the first message, and signifies the receipt of the second message, and means for causing display of the notification.

An apparatus comprising at least one processor and at least one memory, the memory comprising machine-readable instructions, that when executed cause the apparatus to perform receipt of a first message, receipt of a second message, determination that the first message has an unread status, determination that the second message has an unread status, determination that at least one keyword is represented in the first message and the second message in response to the determination that the first message has an unread status and the determination that the second message has an unread status, determination of a notification that identifies the keyword, signifies the receipt of the first message, and signifies the receipt of the second message, and causation of display of the notification.

In at least one example embodiment, the first message is at least one of a text message, an email, a voice message, social networking message, or an instant message.

In at least one example embodiment, the unread status indicates that a message to which the unread status refers has failed to be presented in an interface element that is configured to allow for display of the entirety of the message.

In at least one example embodiment, the keyword is a word that is represented by the first message to an extent that is statistically indicative of importance of the word in the first message.

In at least one example embodiment, the notification omits information representative of content of the first message body that fails to correspond with the keyword.

In at least one example embodiment, the notification omits information representative of content of the second message body that fails to correspond with the keyword.

In at least one example embodiment, the notification signifies receipt of the first message by way of a first message type indicator that indicates a message type of the first message.

In at least one example embodiment, a message type of the second message differs from the message type of the first message, and the notification signifies receipt of the second message by way of a second message type indicator that indicates the message type of the second message.

In at least one example embodiment, the message type is at least one of a text message type, an email type, a voice message type, social networking message type, or an instant message type.

One or more example embodiments further perform determination of a number of messages that represent the keyword and have an unread status such that the number of messages includes an increment for the first and second message.

In at least one example embodiment, the notification comprises a representation of the number of messages such that the number of messages signifies the receipt of the first message and signifies receipt of the second message.

In at least one example embodiment, a message type of the first message corresponds with a message type of the second message.

In at least one example embodiment, the notification comprises a visual representation of the keyword that identifies the keyword.

One or more example embodiments further perform determination that the first message is from a message sender, and determination that the second message is from the message sender, wherein the determination that at least one keyword is represented in the first message and the second message is in response to the determination that the first message is from the message sender and the determination that the second message is from the message sender.

In at least one example embodiment, the notification comprises information indicative of the message sender.

In at least one example embodiment, the information indicative of the message sender is based, at least in part, on contact information associated with the sender.

One or more example embodiments further perform determination that the second message was received within a threshold time from the receipt of the first message, wherein the determination that at least one keyword is represented by the first message and the second message is in response to the determination that the second message was received within the threshold time from the receipt of the first message.

One or more example embodiments further perform determination of a time duration between the receipt of the first message and the receipt of the second message, wherein the notification comprises information indicative of the time duration.

One or more example embodiments further perform entering a lock mode prior to the receipt of the first message, wherein the determination that at least one keyword is represented by the first message and the second message is in response to the receipt of the first message and the receipt of the second message occurring in the lock mode.

One or more example embodiments further perform termination of display of the notification.

One or more example embodiments further perform determination that the first message has a read status, wherein the termination of display of the notification is in response to the determination that the first message has the read status.

One or more example embodiments further perform determination that the second message has a read status, wherein the termination of display of the notification is in response to the determination that the second message has the read status.

One or more example embodiments further perform causation of display of a list of messages that comprises a first message representation indicative of the first message and a second message representation indicative of the second message.

In at least one example embodiment, the first message representation comprises information representative of content of the first message body that fails to correspond with the keyword.

In at least one example embodiment, the first message representation comprises information representative of a subset of the message body bounded by a beginning position of the message body and a position prior to an end position of the message body.

One or more example embodiments further perform receipt of information indicative of a message list input, wherein the termination of display of the notification and the causation of display of the list of messages are caused by the message list input.

One or more example embodiments further perform receipt of information indicative of a message read input, and causation of display of an interface element that is configured to allow for display of the entirety of the message, wherein the termination of display of the notification is in response to the message read input.

One or more example embodiments further perform receipt of a third message, and determination that the third message has an unread status.

One or more example embodiments further perform determination that the keyword fails to be represented in the third message.

One or more example embodiments further perform preclusion of the notification from signifying the receipt of the third message based, at least in part, on the determination that the keyword fails to be represented in the third message.

One or more example embodiments further perform determination of a different notification that signifies the receipt of the third message, the different notification being distinct from the notification.

One or more example embodiments further perform receipt of a fourth message, determination that the fourth message has an unread status, and determination that at least one different keyword is represented in the third message and the fourth message in response to the determination that the third message has an unread status and the determination that the fourth message has an unread status, wherein the different notification identifies the different keyword, and signifies the receipt of the fourth message.

One or more example embodiments further perform determination that the at least one keyword is represented in the third message in response to the determination that the third message has an unread status, and causation of modification of the notification such that the notification signifies the receipt of the third message;

One or more example embodiments further perform determination that the first message was sent from a location, and determination that the second message was sent from the location, wherein the determination that at least one keyword is represented in the first message and the second message is in response to the determination that the first message was sent from the location and the determination that the second message was sent from the location.

In at least one example embodiment, the notification comprises information indicative of the location.

In at least one example embodiment, the information indicative of the location comprises at least one of map information, point of interest information, or location identity information.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
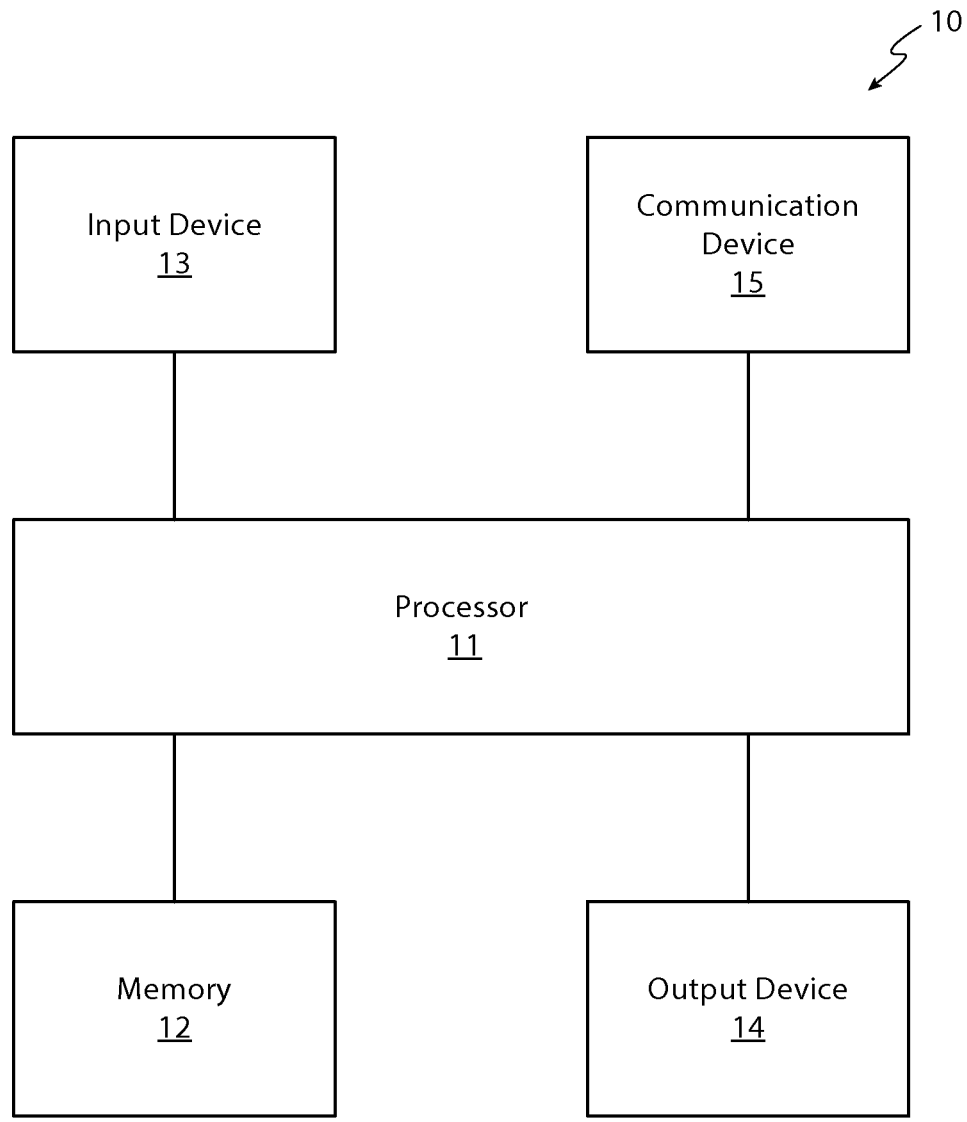
FIG. 1 is a block diagram showing an apparatus according to at least one example embodiment.

An embodiment of the invention and its potential advantages are understood by referring to FIGS. 1 through 13 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a wearable apparatus, a head worn apparatus, a head mounted display apparatus, a wrist worn apparatus, a watch apparatus, a finger worn apparatus, a ring apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, shortrange wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
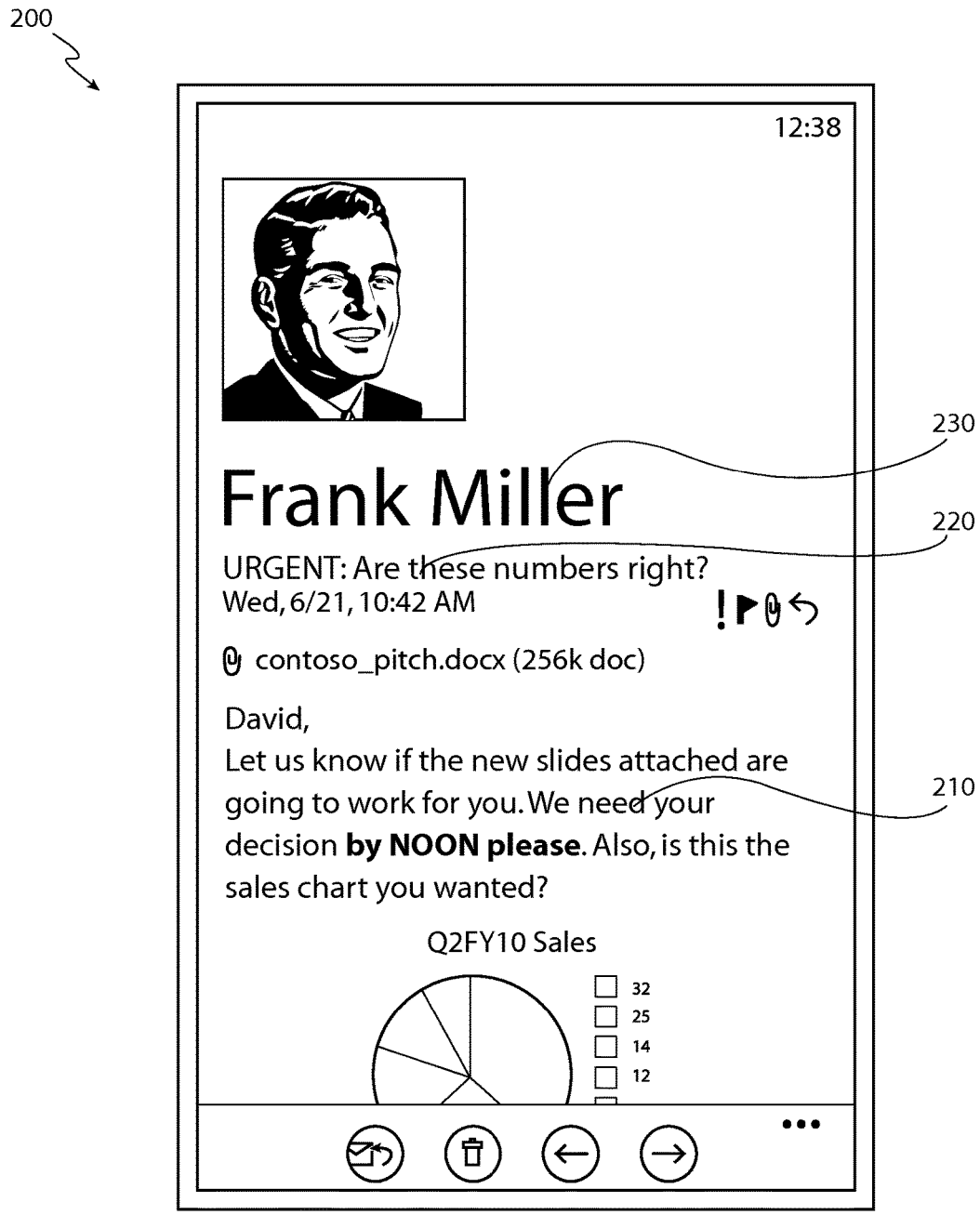
FIG. 2 is a diagram illustrating display of a message according to at least one example embodiment

FIG. 2 is a diagram illustrating display of a message according to at least one example embodiment. The example of FIG. 2 is merely an example and does not limit the scope of the claims. For example, the message type may vary, the representation of the message may vary, the message content may vary, and/or the like.

In many circumstances, it may be desirable for an apparatus to receive a message for a user of the apparatus. For example, a third party may wish to communicate information to the user of the apparatus via a message. A message may refer to a text message, an email, a voice message, a social networking message, an instant message, and/or the like. When receiving a message on an apparatus, it may be desirable for the apparatus to display the content of message, as well as information related to the message. For example, the apparatus may display the content of the message body, a subject, a timestamp, a message sender, and/or the like. In at least one example embodiment, the apparatus determines that the message is from a message sender. A message sender may refer to an entity who drafted the message, initiated delivery of the message, sent the message, and/or the like. For example, the entity who drafted the message or initiated delivery of the message may be a person, an automated messaging service such as a voicemail transcription service, an automated alert service, and/or the like. The apparatus may determine the message sender by evaluating where the message was sent from, where the message was received from, metadata associated with the message that identifies the sender, and/or the like. Upon receiving a message, the apparatus may determine that the message has an unread status. Unread status may indicate that a message to which the unread status refers has failed to be presented in an interface element that is configured to allow for display of the entirety of the message. Upon display of the message by a display element configured to allow for display of the entirety of the message, the apparatus may determine that the message no longer has an unread status, and the apparatus may determine that the message has a read status. Read status may indicate that a message to which the unread status refers has been presented in an interface element that is configured to allow for display of the entirety of the message. In this manner, the read status may indicate that a user has viewed content of the message and the unread status may indicate that a user has failed to view content of the message. In some circumstances, the apparatus may allow a user to modify an unread status to a read status regardless of the viewing of the content of the message. Similarly, the apparatus may allow a user to modify a read status to an unread status regardless of the viewing of the content of the message FIG. 2 illustrates an apparatus 200 which comprises a display. It can be seen that apparatus 200 is displaying various interface elements related to a message. Message body element 210 is an interface element that represents content of the message body. A message body may refer to the main content of a message. For example, if the message is an email, the message body may refer to the body text of the email, any attachments, and/or the like. In at least one example embodiment, the message body excludes other information related to the message, such as header information, metadata, a subject, indication of the message sender, and/or the like. Subject element 220 is an interface element that represents information representative of a subject of the message. Message sender element 230 is an interface element that represents information indicative of a message sender of the message. Information indicative of the message sender may be based, at least in part, on contact information associated with the sender such as a name, an image, telephone number, email address, and/or the like. For example, it can be seen that message sender element 230 includes a contact name and an image.

In at least one example embodiment, an interface element is configured to allow for display of the entirety of a message. For example, the interface element may be configured such that a user may scroll a message on a display comprised by the apparatus, zoom a display in and out, and/or the like. For example, it can be seen that apparatus 200 is merely displaying a portion of the message body displayed in message body element 210 such that a pie chart included in the content of the message body is only partially displayed. The interface element may be configured in a manner that may allow the user of apparatus 200 to scroll message body 210 to allow for display of the entire pie chart.

Figure 3A:
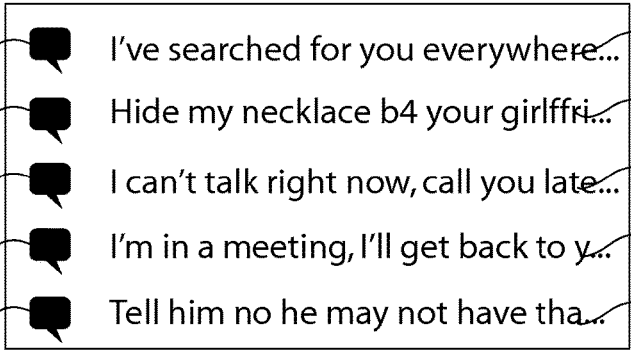
FIGS. 3A-3C are diagrams illustrating display of a list of messages according to at least one example embodiment.
Figure 3B:
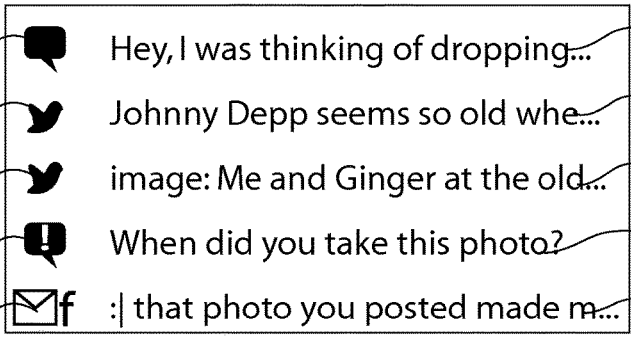
Figure 3C:
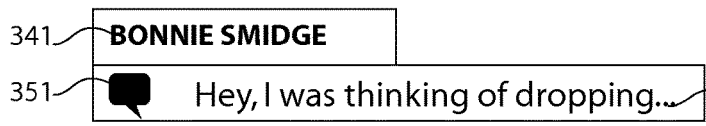
Figure 3C:
Figure 3C:
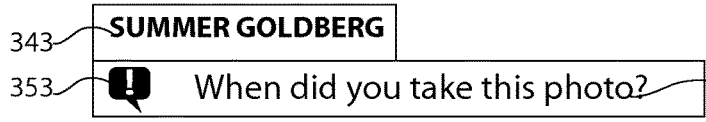
Figure 3C:

FIGS. 3A-3C are diagrams illustrating display of a list of messages according to at least one example embodiment. The examples of FIGS. 3A-3C are merely examples and do not limit the scope of the claims. For example, the number of messages may vary, the types of messages may vary, the message content may vary, and/or the like.

Oftentimes, when an apparatus is configured to receive messages, the apparatus may receive several different messages within a particular period of time. For example, the apparatus may receive at least a first message and a second message. In many circumstances, it may be desirable for the apparatus to display a portion of the messages that were received within a particular period of time as a list. For example, a user of the apparatus may be able to view the list of messages and quickly determine which messages were received. In at least one example embodiment, the apparatus causes display of a list of messages that comprises a first message representation indicative of a first message and a second message representation indicative of a second message. A message representation may comprise information representative of a subset of the message body bounded by a beginning position of the message body and a position prior to an end position of the message body. In at least one example embodiment, a message representation comprises information representative of content of a message body that fails to correspond with the keyword. The keyword may be similar as described regarding FIGS. 4A-4F. In circumstances such as these, a user may be able to quickly identify a particular message that needs his attention immediately, identify other messages that are less important, and/or the like. In some circumstances, it may be desirable for the apparatus to determine if a message has an unread status. For example, if the message has an unread status, the apparatus may indicate to the user that the message is unread. In at least one example embodiment, the apparatus determines that at least one message has an unread status.

FIG. 3A illustrates message list 300. Message list 300 comprises message type indicators 301, 302, 303, 304, and 305, and message summaries 311, 312, 313, 314, and 315. A message type indicator may refer to the format of a message. For example, a message type indicator may refer to a text message type, an email type, a voice message type, a social networking message type, an instant message type, and/or the like. In the example of FIG. 3A, it can be seen that message type indicator 301 is associated with message representation 311, message type indicator 302 is associated with message representation 312, message type indicator 303 is associated with message representation 313, message type indicator 304 is associated with message representation 314, and message type indicator 305 is associated with message representation 315. It can be seen that message type indicators 301-305 are identical. It should understood that such identical representation indicates that the messages associated with message summaries 311-315 are messages of the same message type. For example, the messages associated with message summaries 311-315 may be text messages.

Oftentimes, when an apparatus is configured to receive messages, the apparatus may receive several different types of messages within a particular period of time. For example, the apparatus may receive at least a first message with a first message type and a second message with a second message type. In many circumstances, it may be desirable for the apparatus to display a portion of the messages that were received within a particular period of time as a list. For example, a user of the apparatus may be able to view the list of messages and quickly determine which messages were received. In circumstances such as these, a user may be able to quickly identify a particular message that needs his attention immediately, identify other messages that are less important, and/or the like FIG. 3B illustrates message list 320. Message list 320 comprises message type indicators 321, 322, 323, 324, and 325, and message summaries 331, 332, 333, 334, and 335. It should be understood that message type indicator 321 is associated with message representation 331, message type indicator 322 is associated with message representation 332, message type indicator 323 is associated with message representation 333, message type indicator 324 is associated with message representation 334, and message type indicator 325 is associated with message representation 335. It can be seen that message type indicators 322-323 are identical. It can also be seen that message type indicators 321 and 324-25 differ from each other and differ from message type indicators 322-323. It should understood that this indicates that the messages associated with message summaries 332-333 are messages of the same message type, and that the messages associated with message summaries 331 and 334-335 are different message types from each other and different message types from the messages associated with message summaries 332-333. For example, the message associated with message representation 321 may be a text message, the message associated with message summaries 332-333 may be social media messages, the message associated with message representation 324 may be an instant message, and the message associated with message representation 325 may be an email.

When an apparatus displays a list of messages, it may be desirable for the apparatus to display information indicative of the message sender. For example, a user of the apparatus may be able to view the list of messages and quickly determine from what entity the messages were received. In circumstances such as these, a user may be able to prioritize the order in which he responds to the messages displayed in the list.

FIG. 3C illustrates message list 340. Message list 340 comprises message sender indicators 341, 342, 343, and 344, message type indicators 351, 352, 353, and 354, and message summaries 361, 362, 363, and 364. Message sender indicators 341-344 are interface elements displaying information indicative of message senders associated with messages. It should be understood that message sender indicator 341 is associated with message type indicator 351 and message representation 361, message sender indicator 342 is associated with message type indicator 352 and message representation 362, message sender indicator 343 is associated with message type indicator 353 and message representation 363, and message sender indicator 344 is associated with message type indicator 354 and message representation 364.

FIGS. 4A-4F are diagrams illustrating display of notifications that identify a keyword according to at least one example embodiment. The examples of FIGS. 4A-4F are merely examples and do not limit the scope of the claims. For example, the keywords may vary, the number of keywords may vary, the message types may vary, and/or the like.

Oftentimes, an apparatus may comprise a small display. When an apparatus receives a large number of messages over a short period of time, it often may be difficult to determine how best to notify the user of the received messages. For example, displaying too much information on the display may make the display difficult to read, but displaying too little information on the display may make it difficult for the user to evaluate the content of the messages efficiently. In circumstances such as these, it may be desirable for the apparatus to evaluate the content of received messages and display a notification such that a minimal amount of content about the messages is displayed by the apparatus. For example, this may permit the user to efficiently evaluate the content of the received messages in circumstances where the display is a small display or there are a large number of messages requiring the user's attention. The apparatus may evaluate the content of received messages with a number of techniques.

Oftentimes, when an apparatus receives multiple messages, the messages may be related. For example, the messages may have similar content, may be sent from the same message sender, may have arrived within a particular time period, and/or the like. In circumstances such as these, it may be desirable for the apparatus to notify the user of the relationship between the related messages. For instance, if the user recognizes that several related message were received from the same message sender, he may choose to prioritize response to the message sender of the related messages over response to a message sender of an unrelated message.

In at least one example embodiment, the apparatus determines that at least one keyword is represented in at least a first message and a second message received by the apparatus. For example, the apparatus may determine that a keyword being represented in the first message and the second message is indicative a relationship between the first message and the second message. A keyword may refer to a word represented in a message to an extent that is statistically indicative of importance of the word in the message. The apparatus may determine keywords via an algorithm. For instance, the apparatus may perform a statistical analysis on the words in a message. The statistical analysis may compare word frequencies in the messages against their expected frequencies in a standard reference. For example, the message bodies of a first message and a second message may both comprise a word "meeting" which the apparatus may determine is a keyword, and the apparatus may determine words such as "a," "the," "of," and/or the like are not keywords. In circumstances such as these, the apparatus may determine that the first message and the second message are related based, at least in part, on the common keyword "meeting." In some circumstances, a keyword may comprise multiple words. For example, a keyword may comprise a phrase such as "urgent message." The determination that the keyword is represented in the received messages may be in response to a determination that the received messages have an unread status. In this manner, the apparatus may exclude determining a keyword is represented in any received messages that have a read status. In at least on example embodiment, the apparatus determines a notification that identifies the at least one keyword, signifies the receipt of a first message, and signifies the receipt of a second message. For example, the user may view the notification and quickly determine that the first message and the second message are related based, at least in part, on the common keyword represented in the first message and the second message. In at least one example embodiment, the apparatus causes display of the notification. In at least one example embodiment, the notification signifies receipt of the first message by way of a first message type indicator that indicates a message type of the first message. In at least one example embodiment, a message type of the second message differs from the message type of the first message. In such an example, the notification may signify receipt of the second message by way of a second message type indicator that indicates the message type of the second message. In at least one example embodiment, the notification omits information representative of content of message bodies that fail to correspond with the keyword. For example, a first message may include the word "yesterday" within a message body associated with the first message, and a second message may include the word "tomorrow" in a message body associated with the second message. In this example, the apparatus may determine that "yesterday" and "tomorrow" fail to correspond with keywords and the apparatus may omit "yesterday" and "tomorrow" from the notification. In at least one example embodiment, the notification comprises a visual representation of the keyword that identifies the keyword.

Figure 4A:
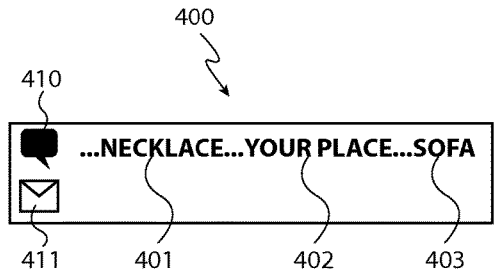
FIGS. 4A-4F are diagrams illustrating display of notifications that identify a keyword according to at least one example embodiment.

FIG. 4A illustrates a notification 400 that identifies at least one keyword and signifies receipt of a first message and a second message. Notification 400 comprises keyword identifiers 401, 402, and 403, and message type indicators 410 and 411. Message type indicator 410 signifies receipt of a message associated with message type indicator 410, and message type indicator 411 signifies receipt of a different message associated with message type indicator 411. It can be seen that message type indicators 410 and 411 indicate different message types. Even though message FIG. 4A illustrates message type indicators 410 and 411 as different message type indicators, in some circumstances message type indicators may be associated with messages of the same type. In circumstances such as these, the apparatus may display a message type indicator that is associated with a plurality of messages. Keyword identifiers 401, 402, and 403 each identify a particular keyword represented within the messages associated with message type indicators 410 and 411. It can be seen that notification 400 fails to comprise content of the message bodies of the messages associated with message type indicators 410 and 411 that fail to correspond with the keywords 401-403. For example, the message bodies of the messages associated with message type indicators 410 and 411 may comprises words in addition to "necklace," "your place," and "sofa."

Oftentimes, when an apparatus receives multiple messages, some of the messages may be related and other messages may be unrelated. In circumstances such as these, it may be desirable that the notification preclude signifying receipt of the unrelated message. For example, signifying the receipt of the unrelated message in the notification may unnecessarily clutter the notification, make the notification more difficult for the user to interpret, and/or the like. In at least one example embodiment, the apparatus receives at least a first message, a second message, and a third message. In this manner, the apparatus may evaluate the content of the first message, the second message, and the third message to determine any relationships among the messages. In at least one example embodiment, the apparatus determines that a keyword that is represented in the first message and the second message fails to be represented in the third message. In at least one example embodiment, the apparatus precludes the notification from signifying the receipt of the third message based, at least in part, on the determination that the keyword fails to be represented in the third message. In this manner, the notification may fail to signify receipt of messages in the notification that are unrelated to the messages signified by the notification. In circumstances such as these, it may be desirable to notify the user of the unrelated message in a different notification. In at least one example embodiment, the apparatus determines a different notification that signifies receipt of the third message, the different notification being distinct from the notification.

In some circumstances, it may be desirable for a notification that identifies keywords represented within a plurality of messages to include a message count. For example, if the plurality of message received by the apparatus all have the same message type, it may be more concise for the notification to display a message count for the messages rather than to display a message type indicator for each message that is represented by the keywords. In at least one example embodiment, the apparatus determines a number of messages received by the apparatus that represent at least one keyword and have an unread status such that the number of messages includes an increment for each unread message that represents the keyword. In at least one example embodiment, the notification comprises a representation of the number of messages such that the number of messages signifies the receipt of a first message and signifies receipt of at least a second message. A representation of a number of messages may be an Arabic numeral, or may be some other representation of quantity such as a Roman numeral, a bar graph, a tally mark, an animation, and or the like. In at least one example embodiment, the message type of the first message corresponds with a message type of the second message.

Figure 4B:
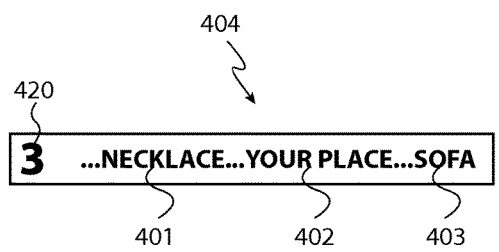

FIG. 4B illustrates a notification 404 that identifies at least one keyword and signifies receipt of a plurality of messages. Notification 404 comprises keyword identifiers 401, 402, and 403, and message count indicators 420. Message count indicator 420 signifies receipt of messages that have an unread status and that include keywords 401, 402, and 403. Keyword identifiers 401, 402, and 403 each identify a particular keyword represented within the messages associated with message count indicator 420. Even though message count indicator 420 represents a message count of 3 messages as illustrated, in some circumstances message count indicator 420 may represent more or fewer messages.

Figure 4C:
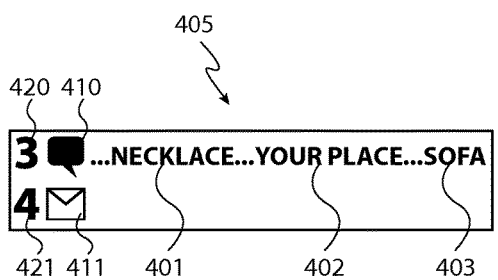

FIG. 4C illustrates a notification 405 that identifies at least one keyword and signifies receipt of a plurality of messages. Notification 405 comprises keyword identifiers 401, 402, and 403, message type indicators 410 and 411, and message count indicators 420 and 421. Message count indicator 420 signifies receipt of messages of the type indicated by message type indicator 410, that have an unread status, and that include keywords 401, 402, and 403. Message count indicator 421 signifies receipt of a messages of the type indicated by message type indicator 411, that have an unread status, and that include keywords 401, 402, and 403. Keyword identifiers 401, 402, and 403 each identify a particular keyword represented within the messages associated with message count indicators 420 and 421. Even though message count indicator 420 represents a message count of 3 messages as illustrated and message count indicator 421 represents a message count of 4 messages as illustrated, in some circumstances message count indicators 420 and 421 may represent more or fewer messages.

In many circumstances, a plurality of messages received by an apparatus may be associated with the same message sender. In circumstances such as these, it may be desirable for a notification that identifies keywords represented within a plurality of messages to include a representation of the message sender. For example, the user may be able to view the notification and determine that they should respond to the message sender in a timely fashion based, at least in part, on the receipt of related messages received from the same message sender. In another example, the keywords may have a different context to the user if the user knows that the keywords were stated by a particular message sender. For example, the keyword "help" may have a different context associated with a marketing message sender than from a child of the user. In at least one example embodiment, the apparatus determines that a message is from a message sender and at least one other message is from the message sender. In this manner, the determination that at least one keyword is represented in the message and the at least one other message may be in response to the determination that the message and the at least one other message is from the message sender. In at least one example embodiment, the notification includes information indicative of the message sender. In at least one embodiment, the information indicative of the message sender is based, at least in part, on contact information associated with the sender.

Figure 4D:
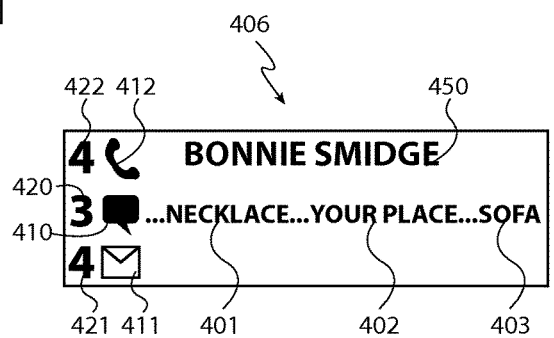

FIG. 4D illustrates a notification 406 that identifies at least one keyword and signifies receipt of a plurality of messages. Notification 406 comprises keyword identifiers 401, 402, and 403, message type indicators 410, 411, and 412, message count indicators 420 421, and 422, and message sender identifier 450. Message count indicator 420 signifies receipt of a messages of the type indicated by message type indicator 410, that have an unread status, and that include keywords 401, 402, and 403. Message count indicator 421 signifies receipt of a messages of the type indicated by message type indicator 411, that have an unread status, and that include keywords 401, 402, and 403. Message count indicator 422 signifies receipt of a messages of the type indicated by message type indicator 412, that have an unread status, and that include keywords 401, 402, and 403. Keyword identifiers 401, 402, and 403 each identify a particular keyword represented within the messages associated with message count indicators 420, 421, and 421. Even though message count indicator 420 represents a message count of 3 messages as illustrated, message count indicator 421 represents a message count of 4 messages as illustrated, and message count indicator 422 represents a message count of 4 messages as illustrated, in some circumstances message count indicators 420, 421, and 422 may represent more or fewer messages. Message sender identifier 450 is representative of the message sender associated the messages associated with message count indicators 420, 421, and 422. In this manner, the user may quickly identify that the message sender identified by message sender identifier 450 sent ten messages that include the keywords "necklace," "your place," and "sofa."

Figure 4E:
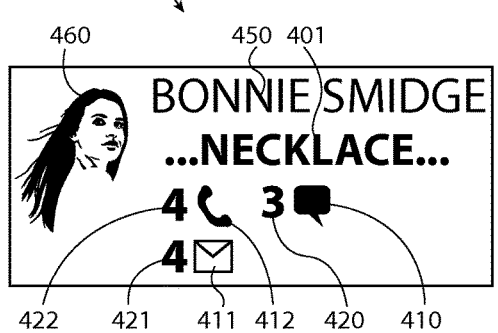

FIG. 4E illustrates a notification 407 that identifies at least one keyword and signifies receipt of a plurality of messages. Notification 407 comprises keyword identifier 401, message type indicators 410, 411, and 412, message count indicators 420 421, and 422, and message sender identifiers 450 and 460. Message count indicator 420 signifies receipt of a messages of the type indicated by message type indicator 410, that have an unread status, and that include keywords 401, 402, and 403. Message count indicator 421 signifies receipt of a messages of the type indicated by message type indicator 411, that have an unread status, and that include keywords 401, 402, and 403. Message count indicator 422 signifies receipt of a messages of the type indicated by message type indicator 412, that have an unread status, and that include keywords 401, 402, and 403. Keyword identifiers 401, 402, and 403 each identify a particular keyword represented within the messages associated with message count indicators 420, 421, and 421. Even though message count indicator 420 represents a message count of 3 messages as illustrated, message count indicator 421 represents a message count of 4 messages as illustrated, and message count indicator 422 represents a message count of 4 messages as illustrated, in some circumstances message count indicators 420, 421, and 422 may represent more or fewer messages. Message sender identifier 450 is representative of the message sender that originated the messages associated with message count indicators 420, 421, and 422. Message sender identifier 460 is an alternate representation of the message sender that originated the messages associated with message count indicators 420, 421, and 422.

In many circumstances when an apparatus receives a plurality of messages, it may be possible for the apparatus to determine a period of time in which at least some of the messages were received. In circumstances such as these, it may be desirable for a notification that identifies keywords represented within the plurality of messages to include a representation of the time duration between receipt of a message and receipt of a different message. For instance, a user who sees the notification may determine that several related messages were received in short period of time. In this manner, the user may infer a degree of importance based on such time information. In at least one example embodiment, the apparatus determines a time duration between the receipt of a message and the receipt of a different message. Time duration may refer to a time measured between the receipt of the message and the receipt the different message. In at least one example embodiment, the notification comprises information indicative of the time duration. For example, the information indicative may be text, an image of a clock, and/or the like.

Figure 4F:
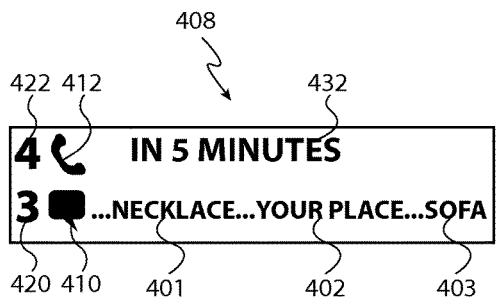

FIG. 4F illustrates a notification 408 that identifies at least one keyword and signifies receipt of a plurality of messages. Notification 408 comprises keyword identifiers 401, 402, and 403, message type indicators 410 and 412, message count indicators 420 and 422, and time duration indicator 432. Message count indicator 420 signifies receipt of a messages of the type indicated by message type indicator 410, that have an unread status, and that include keywords 401, 402, and 403. Message count indicator 422 signifies receipt of a messages of the type indicated by message type indicator 412, that have an unread status, and that include keywords 401, 402, and 403. Keyword identifiers 401, 402, and 403 each identify a particular keyword represented within the messages associated with message count indicators 420 and 422. Even though message count indicator 420 represents a message count of 3 messages as illustrated and message count indicator 422 represents a message count of 4 messages as illustrated, in some circumstances message count indicators 420 and 422 may represent more or fewer messages. Time duration indicator 432 is representative of the time duration between receipt of the first message represented by notification 400 and receipt of the last message represented by notification 400. Even though time duration indicator 432 represents a time duration of 5 minutes, in some circumstances time duration indicator 432 may represent other time durations.

Oftentimes, an apparatus may receive message while the apparatus is in a lock mode condition. Lock mode may refer to a state of operation of the apparatus such that the apparatus is responsive to a particular subset of user inputs. For example, if the apparatus comprises a touchscreen, the apparatus may ignore touch screen inputs while the apparatus is in a lock mode. Such a lock mode may prevent accidental input from being responded to by the apparatus, for example, while the apparatus is in the user's pocket. In many circumstances, an apparatus may determine based, at least in part, on being in lock mode that a user of the apparatus may not be aware of messages received while the apparatus was in lock mode. It may be desirable to restrict analysis of keywords of unread messages to messages received while in lock mode. For example, restricting the analysis of keywords of unread messages to messages received while in lock mode may reduce processing time on the apparatus, help the apparatus disregard messages that the user may have seen but are unread, and/or the like. In at least one example embodiment, the apparatus enters a lock mode prior to the receipt of a first message. In at least one example embodiment, the determination that at least one keyword is represented by the first message and a second message is in response to the receipt of the first message and the receipt of the second message occurring in the lock mode.

Oftentimes, when an apparatus receives a message, the apparatus may be able to determine a location from which the message was sent. For example, the apparatus may be able to read metadata or a message header within the message to determine a location. A location may be a fixed physical location, such as a building, or may be a roving location such as a vehicle cabin. In some circumstances, a plurality of messages may be sent from the same location. Since messages sent from the same location may be related, in circumstances such as these, it may be desirable to determine if common keywords are represented in the messages sent from the same location. In at least on example embodiment, the apparatus determines that a first message was sent from a location and a second message was sent from the location. In at least one example embodiment, the determination that at least one keyword is represented in the first message and the second message is in response to the determination that the first message was sent from the location and the determination that the second message was sent from the location.

In at least one example embodiment, the notification comprises information indicative of the location. In at least one example embodiment, the information indicative of the location comprises at least one of map information, point of interest information, or location identity information. Map information may comprise visual information representative of a location displayed to the user of the apparatus, one or more cartographic details such as roads, one or more geographical features, one or more political boundaries, one or more labels, one or more cardinal directions, one or more scales, and/or the like. For example, map information may comprise a visual representation of a city street layout, with labels for street names, and the borders of the city. In another example, the map information may comprise a floor plan of a large structure, such as an office building, a cruise ship, a stadium, and/or the like. Point of interest may be information corresponding with a location of a point of interest. A point of interest may be a location that the person my find useful or interesting. For example, a point of interest may correspond with a restaurant, a fuel refilling station, a hotel, a tourist attraction, and/or the like. Location identity information may be information that particularly identifies a location. For example, location identity information may comprise latitude and longitude, map grid coordinates, a physical address, and/or the like.

In many circumstances, after display of a notification, it may be desirable to terminate display of the notification. For example, the information displayed in the notification may no longer be accurate after new messages are received, the user may have read the notification, a timer associated with the notification may have expired, the apparatus may have entered lock mode, and/or the like. In at least one example embodiment, the apparatus terminates display of the notification. In at least one example embodiment, the apparatus determines that at least one message has a read status. In this manner, the termination of display of the notification may be in response to the determination that the message has the read status. In at least one example embodiment, the apparatus determines that a second message has a read status. In this manner, the termination of display of the notification may be in response to the determination that the second message has the read status.

In at least one example embodiment, the apparatus receives information indicative of a message list input. In this manner the termination of the display of the notification may be based, at least in part, by the message list input. A message list input refers to an input that causes display of a list of messages, similar as described regarding FIGS. 3A-3C. A message list input may be any type of input, such as a touch input, a voice input, a tactile input, an input similar as described regarding FIG. 1, and/or the like.

In at least one example embodiment, the apparatus receives information indicative of a message read input. In this manner the termination of the display of the notification may be based, at least in part, by the message read input. A message read input refers to an input that causes display of an interface element that is configured to allow for display of the entirety of a message, similar as described regarding FIG. 2. A message read input may be any type of input, such as a touch input, a voice input, a tactile input, an input similar as described regarding FIG. 1, and/or the like.

Figure 5:
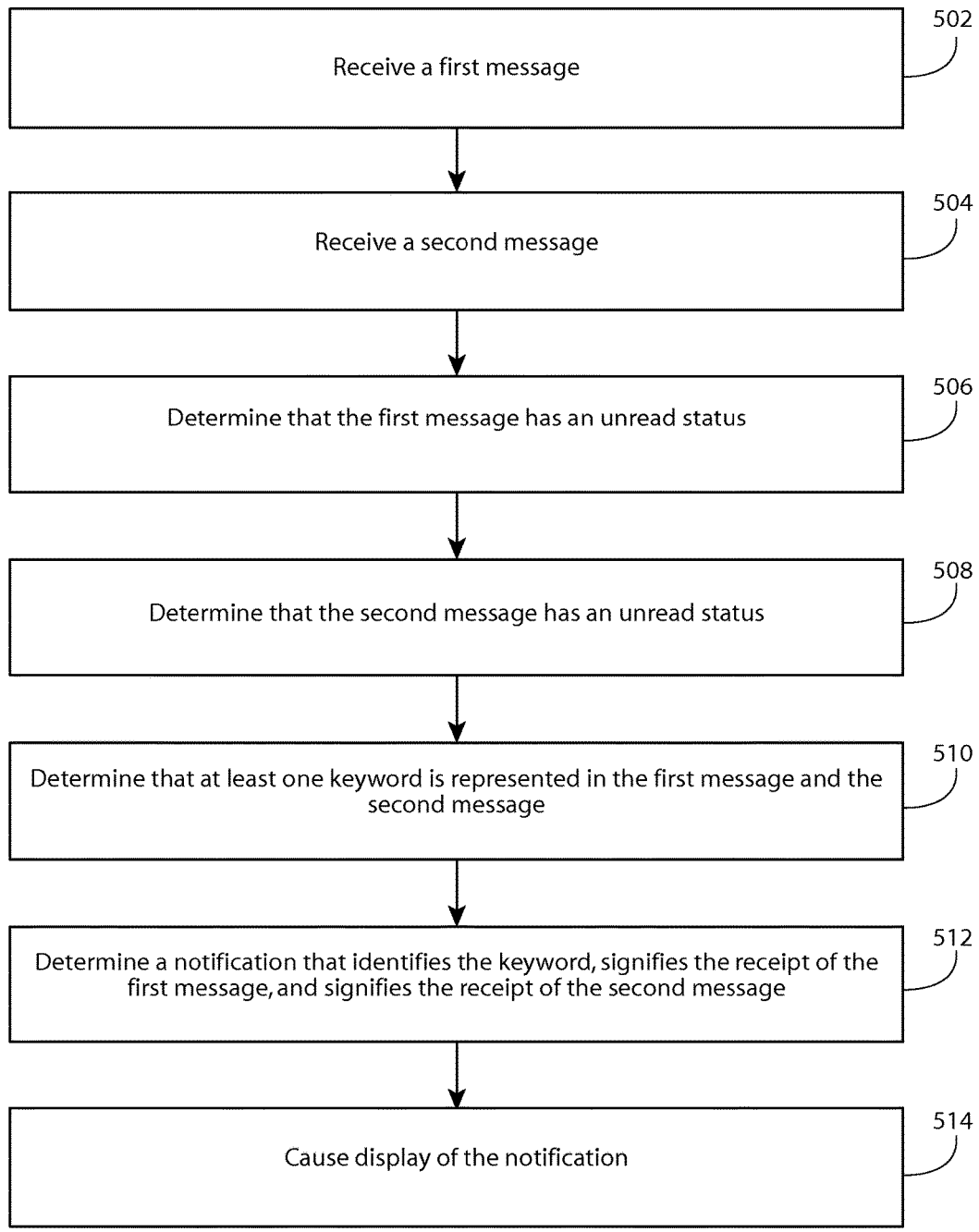
FIG. 5 is a flow diagram illustrating activities associated with determining a keyword is represented in a message according to at least one example embodiment.

FIG. 5 is a flow diagram illustrating activities associated with determining a keyword is represented in a message according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus receives a first message. The receipt and the message may be similar as described regarding FIG. 2 and FIGS. 3A-3C.

At block 504, the apparatus receives a second message. The receipt and the message may be similar as described regarding FIG. 2 and FIGS. 3A-3C.

At block 506, the apparatus determines that the first message has an unread status. The determination and the unread status may be similar as described regarding FIG. 2 and FIGS. 3A-3C.

At block 508, the apparatus determines that the second message has an unread status. The determination and the unread status may be similar as described regarding FIG. 2 and FIGS. 3A-3C.

At block 510, the apparatus determines that at least one keyword is represented in the first message and the second message. In this manner, the determination that at least one keyword is represented in the first message and the second message may be in response to the determination that the first message has an unread status and the determination that the second message has an unread status. The determination and the keyword may be similar as described regarding FIGS. 4A-4F.

At block 512, the apparatus determines a notification that identifies the keyword, signifies the receipt of the first message, and signifies the receipt of the second message. The determination and the notification may be similar as described regarding FIGS. 4A-4F.

At block 514, the apparatus causes display of the notification. The display may be similar as described regarding FIGS. 4A-4F.

Figure 6:
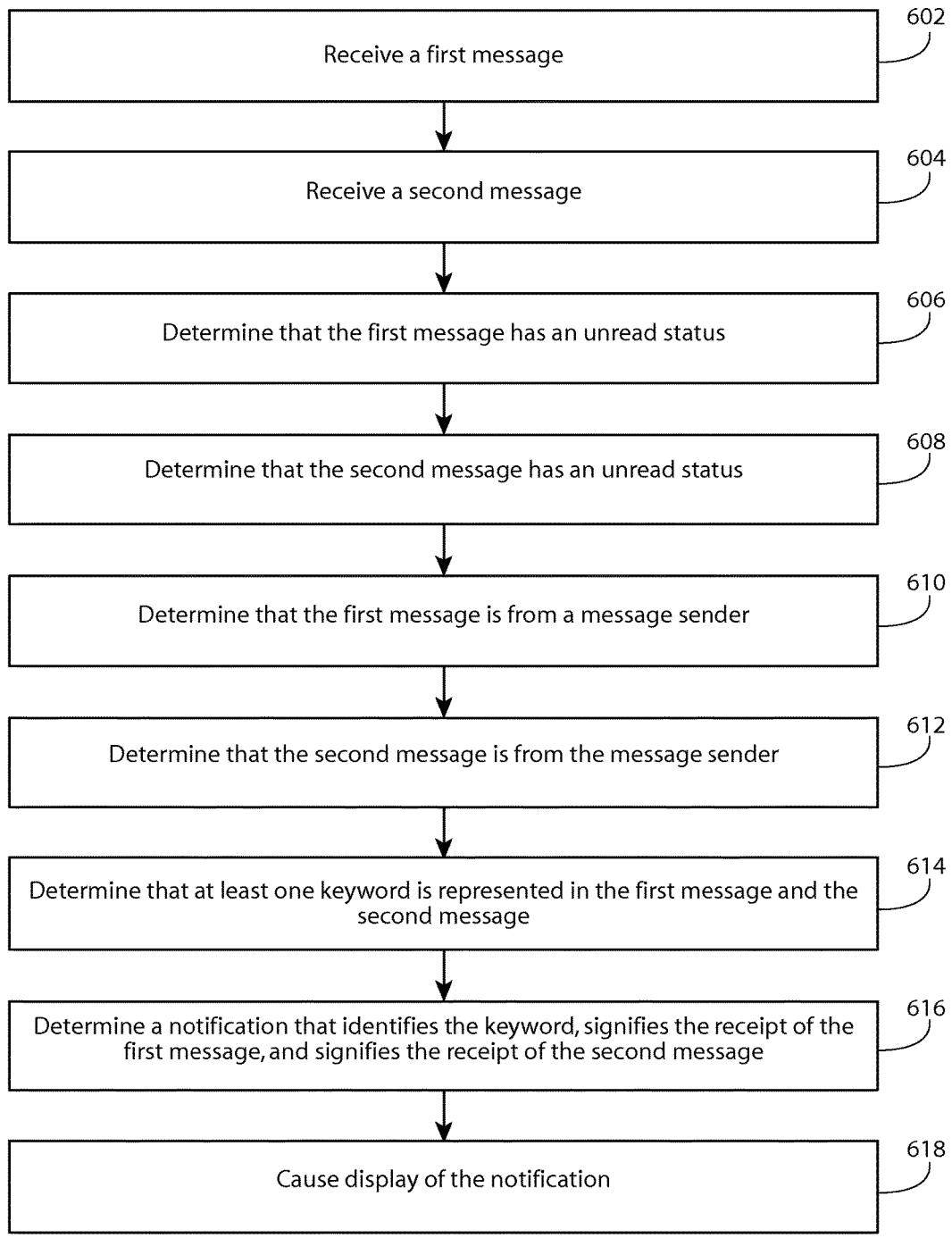
FIG. 6 is a flow diagram illustrating activities associated with determining a message is from a message sender according to at least one example embodiment.

FIG. 6 is a flow diagram illustrating activities associated with determining a message is from a message sender according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As previously described, it may be desirable to determine that a message is from a message sender.

At block 602, the apparatus receives a first message, similarly as described regarding block 502 of FIG. 5. At block 604, the apparatus receives a second message, similarly as described regarding block 504 of FIG. 5. At block 606, the apparatus determines that the first message has an unread status, similarly as described regarding block 506 of FIG. 5. At block 608, the apparatus determines that the second message has an unread status, similarly as described regarding block 508 of FIG. 5.

At block 610, the apparatus determines that the first message is from a message sender. The determination and the message sender may be similar as described regarding FIG. 2, FIGS. 3A-3C, and FIGS. 4A-4F.

At block 612, the apparatus determines that the second message is from the message sender. The determination may be similar as described regarding FIG. 2, FIGS. 3A-3C, and FIGS. 4A-4F.

At block 614, the apparatus determines that at least one keyword is represented in the first message and the second message. In this manner, the determination that at least one keyword is represented in the first message and the second message may be in response to the determination that the first message is from the message sender and the determination that the second message is from the message sender. The determination and the keyword may be similar as described regarding FIGS. 4A-4F.

At block 616, the apparatus determines a notification that identifies the keyword, signifies the receipt of the first message, and signifies the receipt of the second message, similarly as described regarding block 512 of FIG. 5. At block 618, the apparatus causes display of the notification, similarly as described regarding block 514 of FIG. 5.

Figure 7:
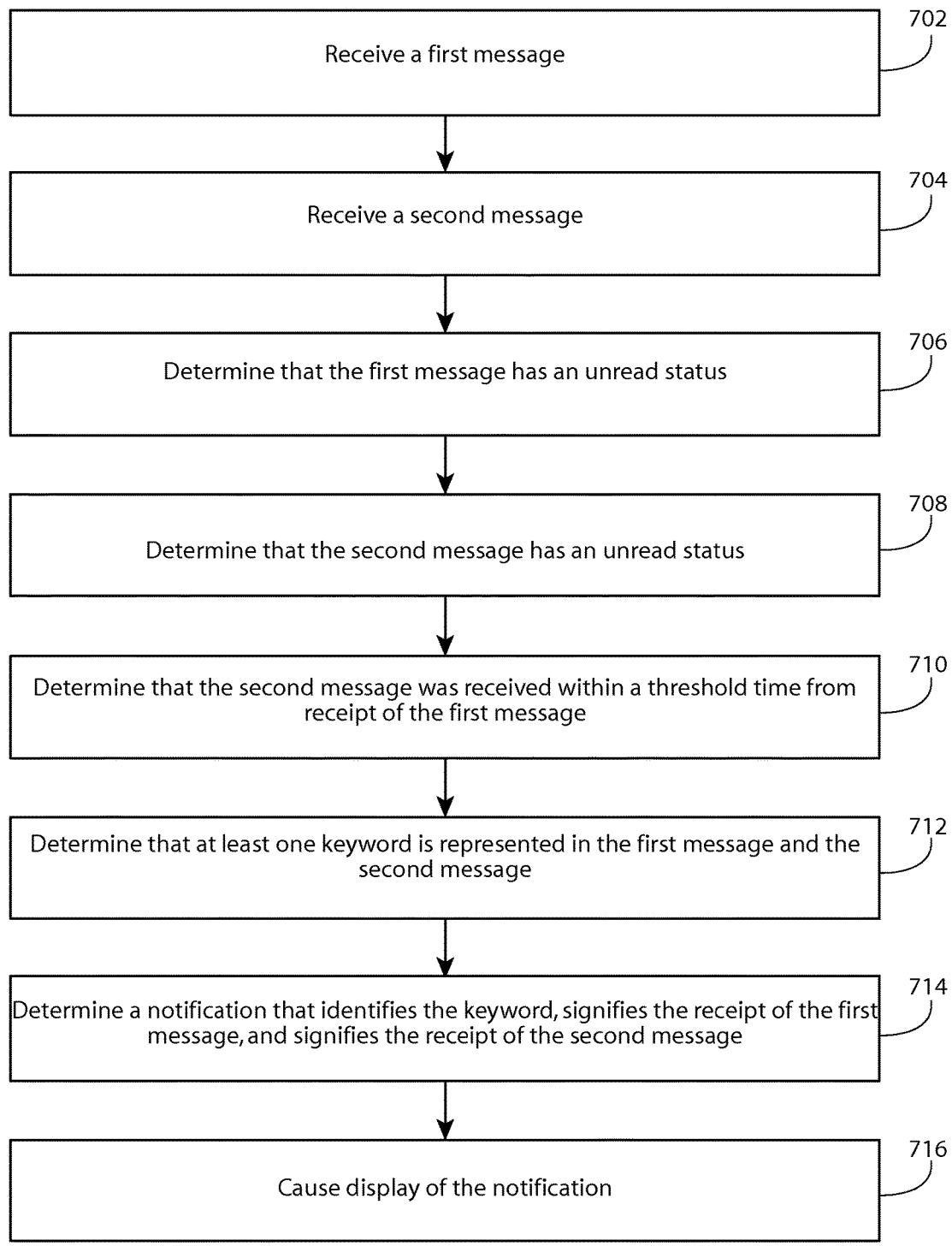
FIG. 7 is a flow diagram illustrating activities associated with determining a message is received within a threshold time according to at least one example embodiment.

FIG. 7 is a flow diagram illustrating activities associated with determining a message is received within a threshold time according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

In at least some circumstances, it may be desirable to determine that a message was received within a threshold time from the receipt of an earlier message. For example, it may be desirable to restrict determining keywords that are represented in messages to messages that were received within the threshold time. A threshold time may be a predefined time, such as a user defined time. For example, a user may define a threshold time to be fifteen minutes. In this example, the apparatus may restrict determination of keywords that are represented in messages received within fifteen minutes of receipt of a first message. In at least one example embodiment, the apparatus determines that a second message was received within a threshold time from the receipt of a first message. In this manner, the determination that at least one keyword is represented by the first message and the second message may be in response to the determination that the second message was received within the threshold time from the receipt of the first message.

At block 702, the apparatus receives a first message, similarly as described regarding block 502 of FIG. 5. At block 704, the apparatus receives a second message, similarly as described regarding block 504 of FIG. 5. At block 706, the apparatus determines that the first message has an unread status, similarly as described regarding block 506 of FIG. 5. At block 708, the apparatus determines that the second message has an unread status, similarly as described regarding block 508 of FIG. 5.

At block 710, the apparatus determines that the second message was received within a threshold time from the receipt of the first message. The determination and the threshold time may be similar as described regarding FIGS. 4A-4F.

At block 712, the apparatus determines that at least one keyword is represented in the first message and the second message. In this manner, the determination that at least one keyword is represented by the first message and the second message may be in response to the determination that the second message was received within the threshold time from the receipt of the first message. The determination and the keyword may be similar as described regarding FIGS. 4A-4F.

At block 714, the apparatus determines a notification that identifies the keyword, signifies the receipt of the first message, and signifies the receipt of the second message, similarly as described regarding block 512 of FIG. 5. At block 716, the apparatus causes display of the notification, similarly as described regarding block 514 of FIG. 5.

Figure 8:
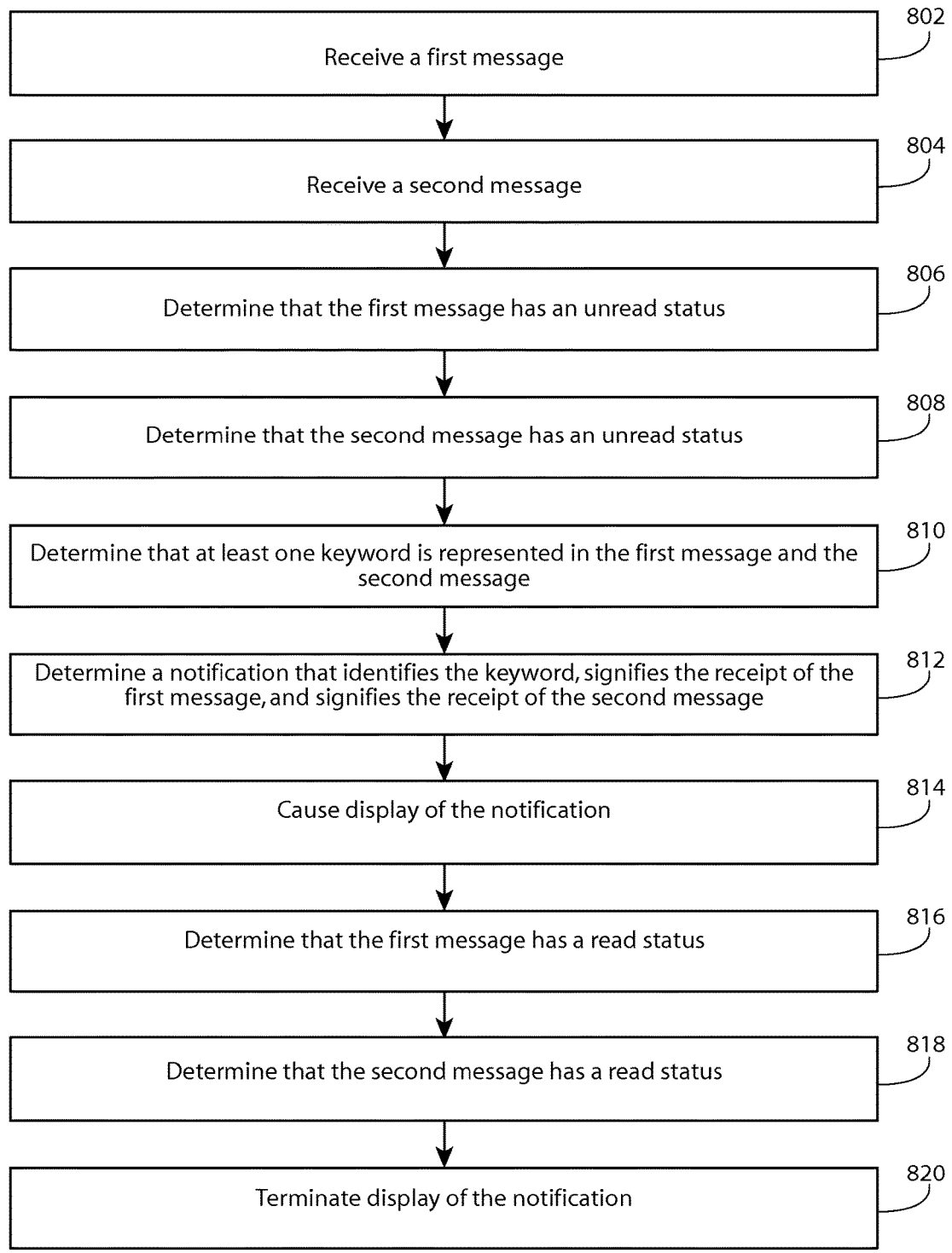
FIG. 8 is a flow diagram illustrating activities associated with determining a message has a read status according to at least one example embodiment.

FIG. 8 is a flow diagram illustrating activities associated with determining a message has a read status according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, it may be desirable to determine a read status of a message, and to terminate display of a notification in response to the read status.

At block 802, the apparatus receives a first message, similarly as described regarding block 502 of FIG. 5. At block 804, the apparatus receives a second message, similarly as described regarding block 504 of FIG. 5. At block 806, the apparatus determines that the first message has an unread status, similarly as described regarding block 506 of FIG. 5. At block 808, the apparatus determines that the second message has an unread status, similarly as described regarding block 508 of FIG. 5. At block 810, the apparatus determines that at least one keyword is represented in the first message and the second message, similarly as described regarding block 510 of FIG. 5. At block 812, the apparatus determines a notification that identifies the keyword, signifies the receipt of the first message, and signifies the receipt of the second message, similarly as described regarding block 512 of FIG. 5. At block 814, the apparatus causes display of the notification, similarly as described regarding block 514 of FIG. 5.

At block 816, the apparatus determines that the first message has a read status. The determination and the read status may be similar as described regarding FIGS. 4A-4F.

At block 818, the apparatus determines that the second message has a read status. The determination and the read status may be similar as described regarding FIGS. 4A-4F.

At block 820, the apparatus terminates display of the notification. In this manner, the termination of display of the notification may be in response to the determination that the first message has the read status and the determination that the second message has the read status. The termination may be similar as described regarding FIGS. 4A-4F. Even though the example of FIG. 8 illustrates termination of display of the notification in response to read status of both the first message and the second message, in some circumstances, termination of display of the notification may be in response to a single read status of a message represented by the notification.

Figure 9:
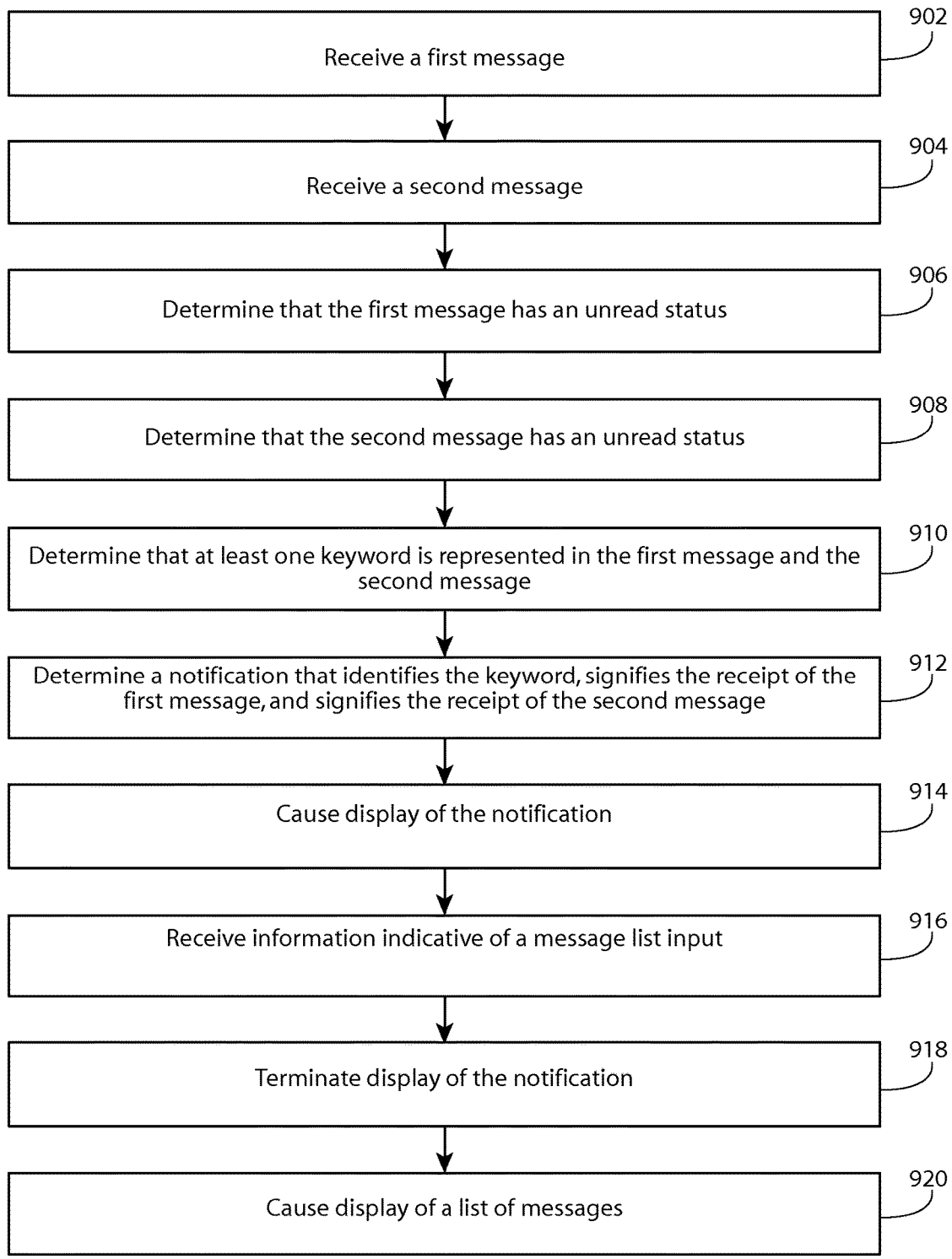
FIG. 9 is a flow diagram illustrating activities associated with causing display of a list of messages according to at least one example embodiment.

FIG. 9 is a flow diagram illustrating activities associated with causing display of a list of messages according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, it may be desirable to cause display of a list of messages. In such circumstances, it may be desirable for the list of messages to comprise the messages that are represented by the notification. For example, a user may desire to invoke a list of messages represented by notification 407 of FIG. 4E. In such an example, the user may perform an input in relation to notification 407 to cause the apparatus to cause display of the list of messages that are represented by notification 407.

At block 902, the apparatus receives a first message, similarly as described regarding block 502 of FIG. 5. At block 904, the apparatus receives a second message, similarly as described regarding block 504 of FIG. 5. At block 906, the apparatus determines that the first message has an unread status, similarly as described regarding block 506 of FIG. 5. At block 908, the apparatus determines that the second message has an unread status, similarly as described regarding block 508 of FIG. 5. At block 910, the apparatus determines that at least one keyword is represented in the first message and the second message, similarly as described regarding block 510 of FIG. 5. At block 912, the apparatus determines a notification that identifies the keyword, signifies the receipt of the first message, and signifies the receipt of the second message, similarly as described regarding block 512 of FIG. 5. At block 914, the apparatus causes display of the notification, similarly as described regarding block 514 of FIG. 5.

At block 916, the apparatus receives information indicative of a message list input. The message list input may be similar as described regarding FIGS. 4A-4F.

At block 918, the apparatus terminates display of the notification. In this manner, the termination of display of the notification may be in response to the message list input. The termination may be similar as described regarding FIGS. 4A-4F.

At block 920, the apparatus causes display of a list of messages. The list of messages comprises a first message representation indicative of the first message and a second message representation indicative of the second message. In this manner, the causation of display of the list of message may be in response to the message list input. The display and the list of messages may be similar as described regarding FIGS. 3A-3C and FIGS. 4A-4F.

Figure 10:
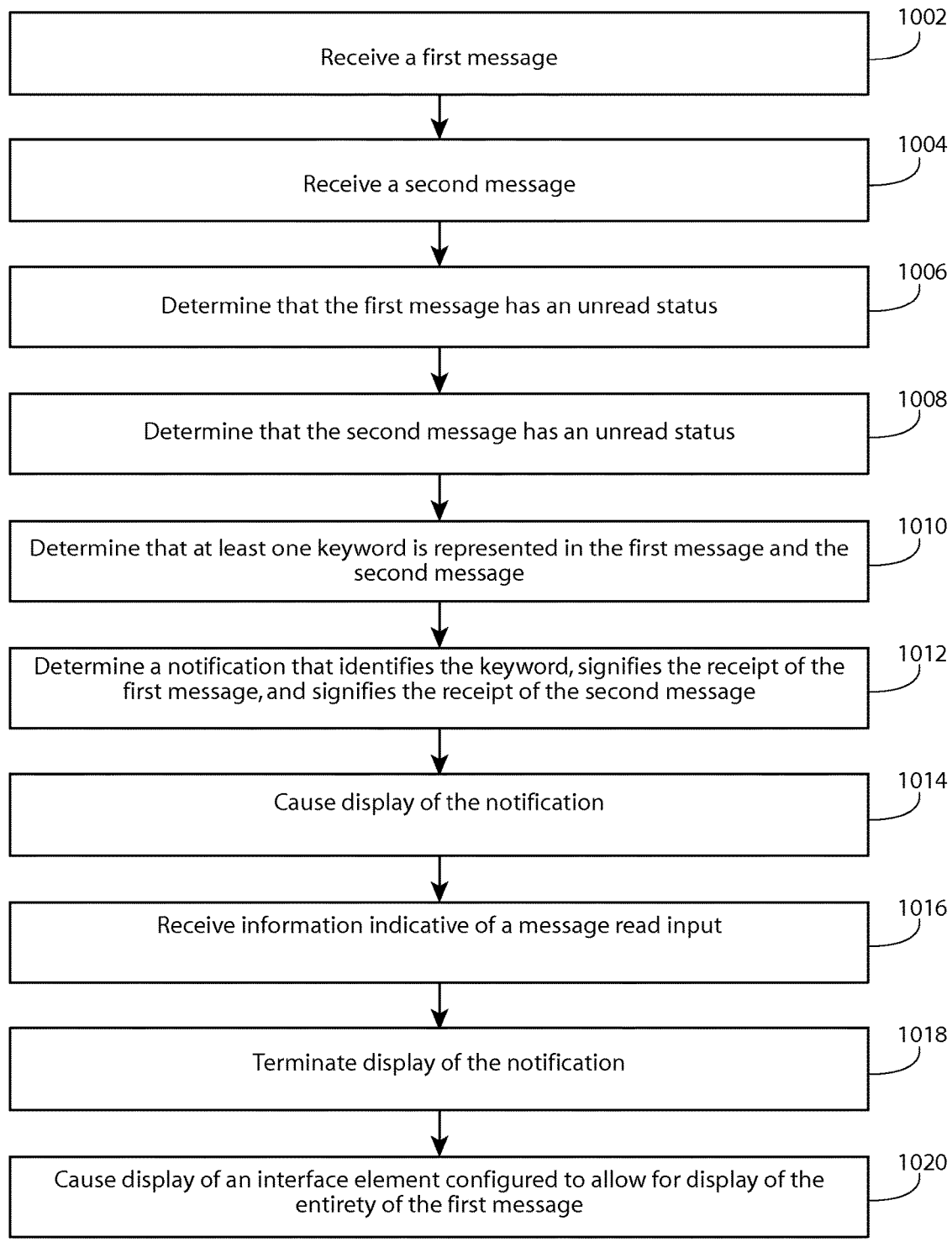
FIG. 10 is a flow diagram illustrating activities associated with causing display of an interface element according to at least one example embodiment.

FIG. 10 is a flow diagram illustrating activities associated with causing display of an interface element according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, it may be desirable to display an interface element configured to allow for display of the entirety of a message. In such an example, the apparatus may terminate display of the notification in response to the causation of display of the interface element configured to allow for display of the entirety of the message.

At block 1002, the apparatus receives a first message, similarly as described regarding block 502 of FIG. 5. At block 1004, the apparatus receives a second message, similarly as described regarding block 504 of FIG. 5. At block 1006, the apparatus determines that the first message has an unread status, similarly as described regarding block 506 of FIG. 5. At block 1008, the apparatus determines that the second message has an unread status, similarly as described regarding block 508 of FIG. 5. At block 1010, the apparatus determines that at least one keyword is represented in the first message and the second message, similarly as described regarding block 510 of FIG. 5. At block 1012, the apparatus determines a notification that identifies the keyword, signifies the receipt of the first message, and signifies the receipt of the second message, similarly as described regarding block 512 of FIG. 5. At block 1014, the apparatus causes display of the notification, similarly as described regarding block 514 of FIG. 5.

At block 1016, the apparatus receives information indicative of a message read input. The message read input may be similar as described regarding FIGS. 4A-4F.

At block 1018, the apparatus terminates display of the notification. In this manner the termination of display of the notification may be in response to the message read input. The termination may be similar as described regarding FIGS. 4A-4F.

At block 1020, the apparatus causes display of an interface element that is configured to allow for display of the entirety of the message. The interface element may be similar as described regarding FIG. 2.

Figure 11:
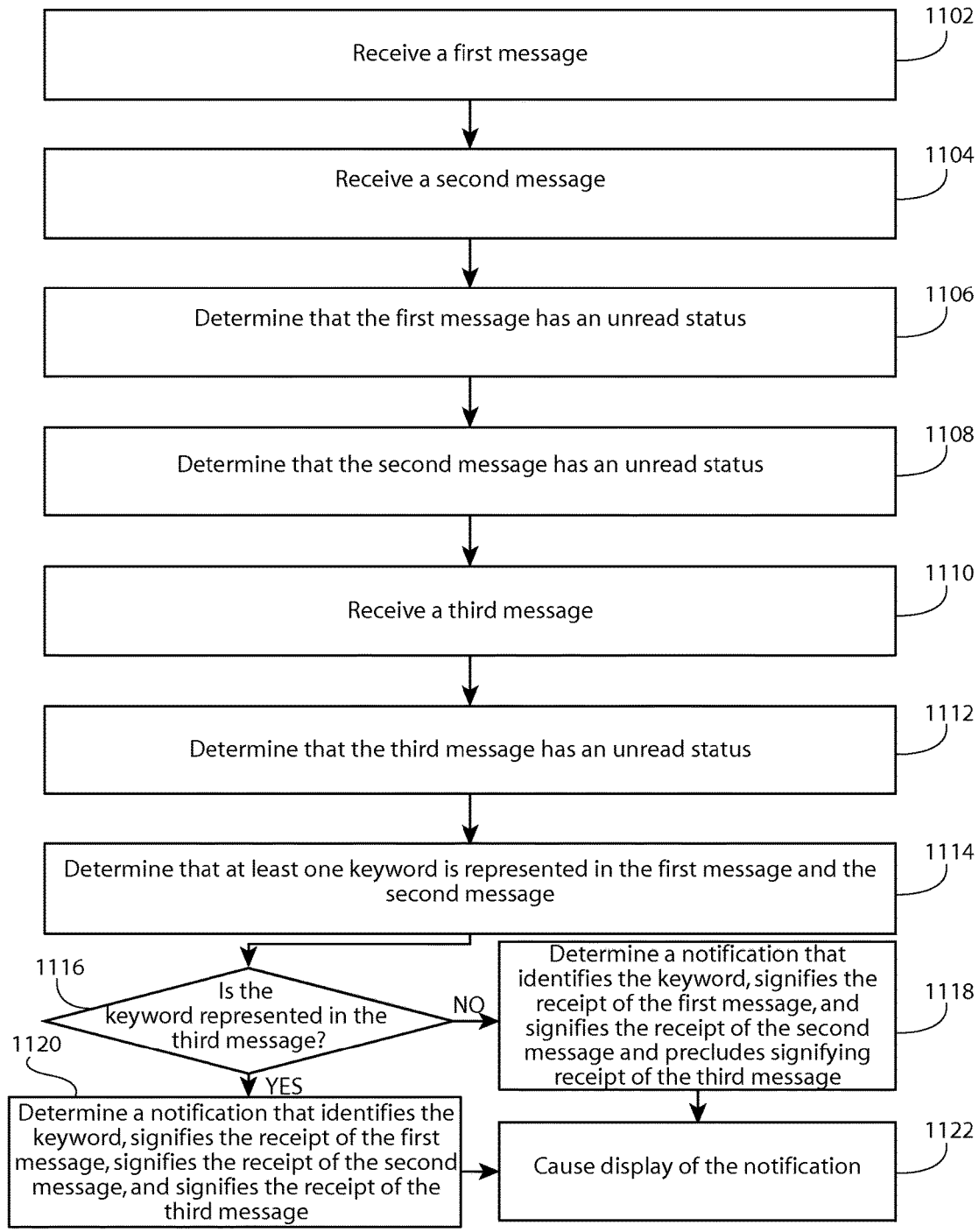
FIG. 11 is a flow diagram illustrating activities associated with determining a keyword is represented in a message according to at least one example embodiment.

FIG. 11 is a flow diagram illustrating activities associated with determining a keyword is represented in a message according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, it may be desirable to avoid representing messages in the notification that fail to include the keywords.

At block 1102, the apparatus receives a first message, similarly as described regarding block 502 of FIG. 5. At block 1104, the apparatus receives a second message, similarly as described regarding block 504 of FIG. 5. At block 1106, the apparatus determines that the first message has an unread status, similarly as described regarding block 506 of FIG. 5. At block 1108, the apparatus determines that the second message has an unread status, similarly as described regarding block 508 of FIG. 5.

At block 1110, the apparatus receives a third message. The receipt and the message may be similar as described regarding FIG. 2 and FIGS. 3A-3C.

At block 1112, the apparatus determines that the third message has an unread status. The determination and the unread status may be similar as described regarding FIG. 2 and FIGS. 3A-3C. At block 1114, the apparatus determines that at least one keyword is represented in the first message and the second message similarly as described regarding block 510 of FIG. 5.

At block 1116, the apparatus determines whether the keyword is represented in the third message. The determination may be similar as described regarding FIGS. 4A-4F. If the apparatus determines that the keyword fails to be represented in the third message, flow proceeds to block 1118. If the apparatus determines that the keyword is represented in the third message, flow proceeds to block 1120.

At block 1118, the apparatus determines a notification that identifies the keyword, signifies the receipt of the first message, signifies the receipt of the second message, and precludes signifying the receipt of the third message. In this manner, the notification precluding signifying the receipt of the third message may be based, at least in part, on the determination that the keyword fails to be represented in the third message. The determination and the notification may be similar as described regarding FIGS. 4A-4F.

At block 1120, the apparatus he apparatus determines a notification that identifies the keyword, signifies the receipt of the first message, signifies the receipt of the second message, and signifies the receipt of the third message. In this manner, the notification signifying the receipt of the third message may be in response to the determination that the keyword is represented in the third message. The determination and the notification may be similar as described regarding FIGS. 4A-4F.

At block 1122, the apparatus causes display of the notification, similarly as described regarding block 514 of FIG. 5.

Figure 12:
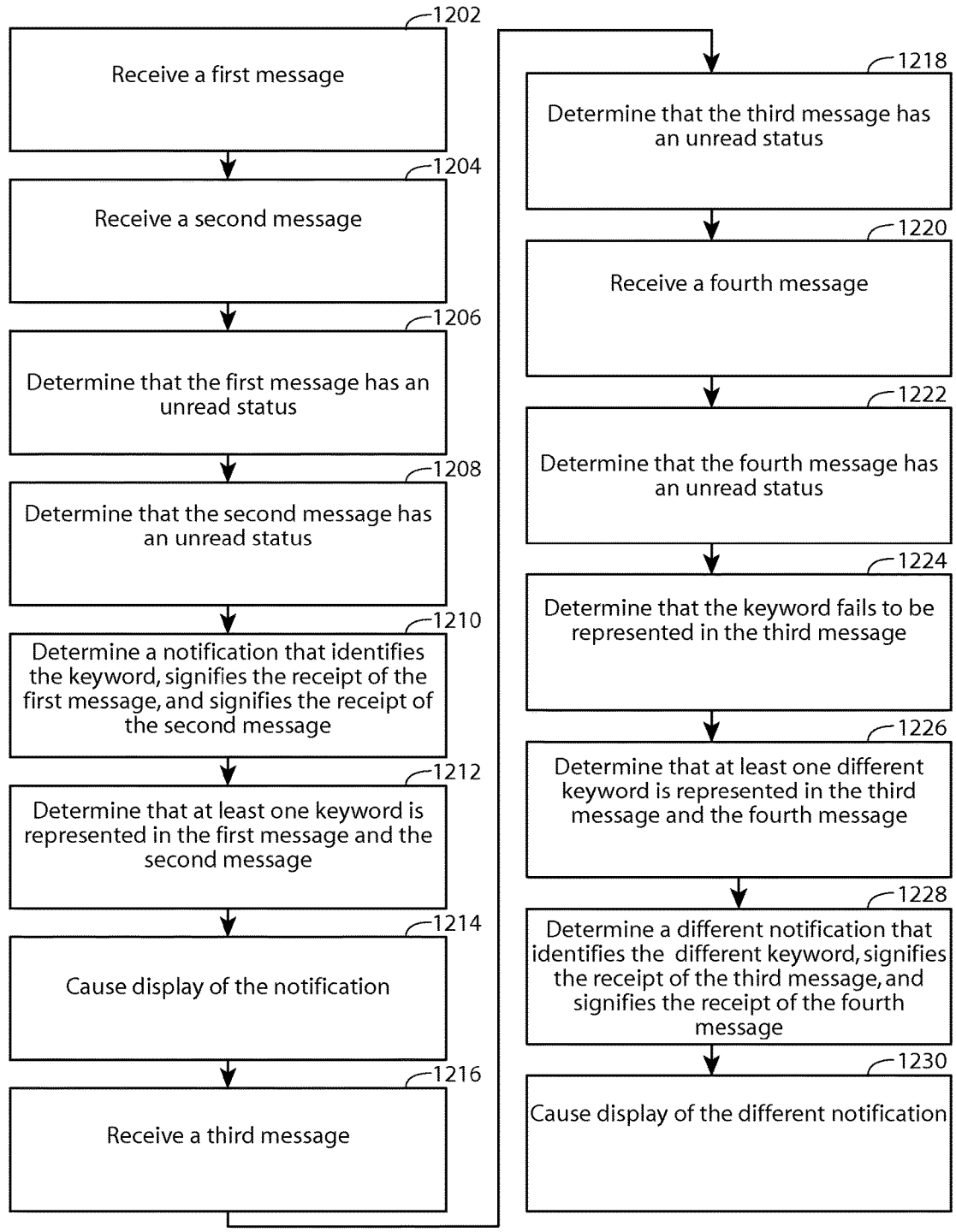
FIG. 12 is a flow diagram illustrating activities associated with determining a keyword is represented in a message according to at least one example embodiment.

FIG. 12 is a flow diagram illustrating activities associated with determining a keyword is represented in a message according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

In some circumstances, when an apparatus receives a plurality of messages, a subset of the messages may be related, and a different subset of the messages may be related, but the messages in the subset may be unrelated to the messages in the different subset. In circumstances such as these, it may be desirable to create and display different notifications for each subset of related messages. In some circumstances, the apparatus may sort the various notifications, for example by number of messages represented, time of receipt of the most recent message represented by the notification, etc.

At block 1202, the apparatus receives a first message, similarly as described regarding block 502 of FIG. 5. At block 1204, the apparatus receives a second message, similarly as described regarding block 504 of FIG. 5. At block 1206, the apparatus determines that the first message has an unread status, similarly as described regarding block 506 of FIG. 5. At block 1208, the apparatus determines that the second message has an unread status, similarly as described regarding block 508 of FIG. 5. At block 1210, the apparatus determines that at least one keyword is represented in the first message and the second message, similarly as described regarding block 510 of FIG. 5. At block 1212, the apparatus determines a notification that identifies the keyword, signifies the receipt of the first message, and signifies the receipt of the second message, similarly as described regarding block 512 of FIG. 5. At block 1214, the apparatus causes display of the notification, similarly as described regarding block 514 of FIG. 5. At block 1216, the apparatus receives a third message, similarly as described regarding block 1110 of FIG. 11. At block 1218, the apparatus determines that the third message has an unread status, similarly as described regarding block 1112 of FIG. 11.

At block 1220, the apparatus receives a fourth message. The receipt and the message may be similar as described regarding FIG. 2 and FIGS. 3A-3C.

At block 1222, the apparatus determines that the fourth message has an unread status, the determination and the unread status may be similar as described regarding FIG. 2 and FIGS. 3A-3C.

At block 1224, the apparatus determines that the keyword fails to be represented in the third message. The determination may be similar as described regarding FIGS. 4A-4F.

At block 1226, the apparatus determines that at least one different keyword is represented in the third message and the fourth message. In this manner, the determination that at least one different keyword is represented in the third message and the fourth message may be in response to the determination that the third message has an unread status and the determination that the fourth message has an unread status. The determination and the different keyword may be similar as described regarding FIGS. 4A-4F.

At block 1228, the apparatus determines a different notification that identifies the different keyword, signifies the receipt of the third message, and signifies the receipt of the fourth message. The different notification is distinct from the notification. The determination and the different notification may be similar as described regarding FIGS. 4A-4F.

At block 1230, the apparatus causes display of the different notification. The display may be similar as described regarding FIGS. 4A-4F.

Figure 13:
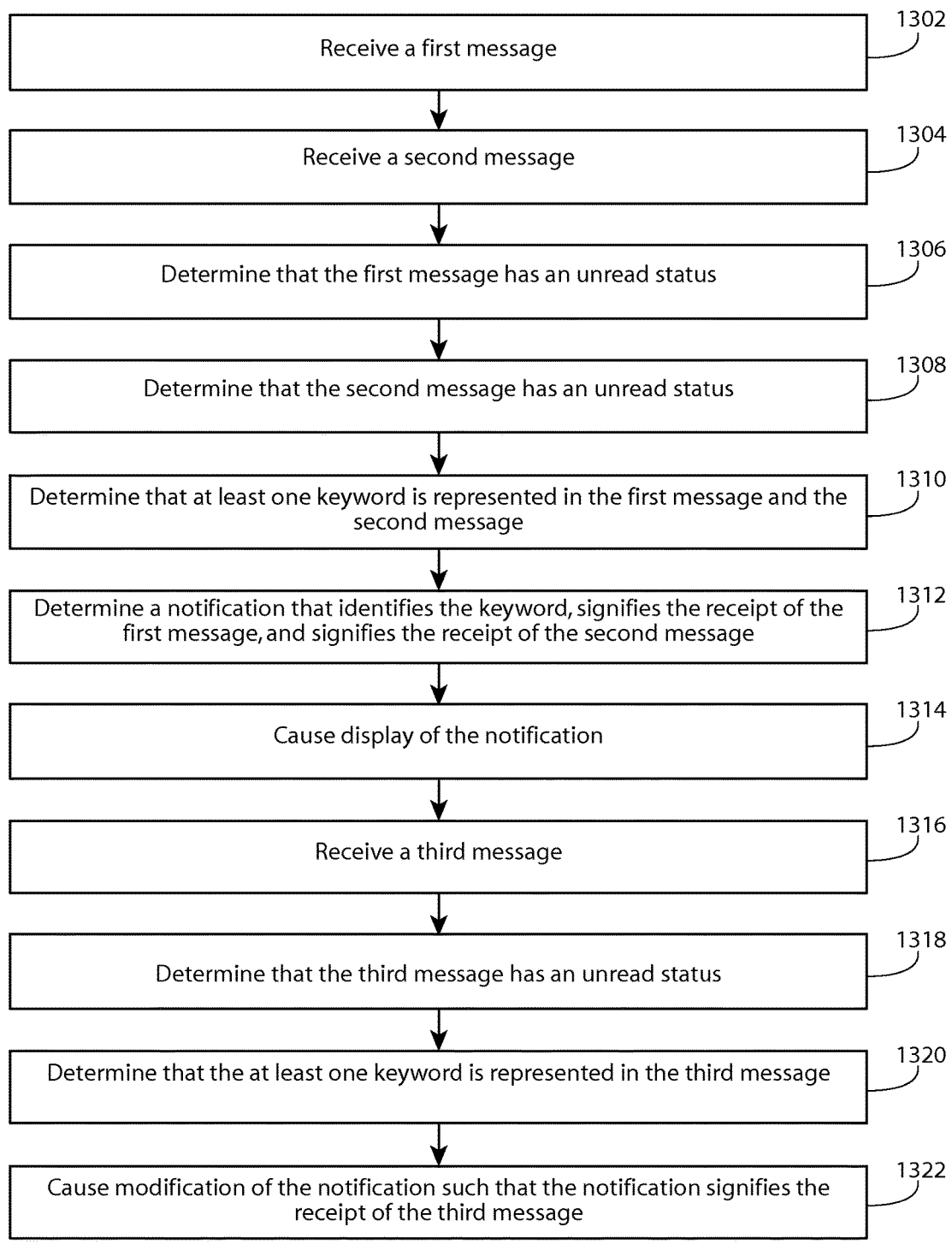
FIG. 13 is a flow diagram illustrating activities associated with determining a keyword is represented in a message according to at least one example embodiment.

FIG. 13 is a flow diagram illustrating activities associated with determining a keyword is represented in a message according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

In some circumstance, an apparatus may receive a new message related to earlier received messages after a notification has already been displayed. For example, the new message may have a keyword in common with the earlier messages, may have originated from the same location as earlier messages, arrived within a threshold time, and/or the like. In circumstances such as these, it may be desirable to modify the notification such that the notification signifies receipt of the new message.

At block 1302, the apparatus receives a first message, similarly as described regarding block 502 of FIG. 5. At block 1304, the apparatus receives a second message, similarly as described regarding block 504 of FIG. 5. At block 1306, the apparatus determines that the first message has an unread status, similarly as described regarding block 506 of FIG. 5. At block 1308, the apparatus determines that the second message has an unread status, similarly as described regarding block 508 of FIG. 5. At block 1310, the apparatus determines that at least one keyword is represented in the first message and the second message, similarly as described regarding block 510 of FIG. 5. At block 1312, the apparatus determines a notification that identifies the keyword, signifies the receipt of the first message, and signifies the receipt of the second message, similarly as described regarding block 512 of FIG. 5. At block 1314, the apparatus causes display of the notification, similarly as described regarding block 514 of FIG. 5. At block 1316, the apparatus receives a third message, similarly as described regarding block 1110 of FIG. 11. At block 1318, the apparatus determines that the third message has an unread status, similarly as described regarding block 1112 of FIG. 11.

At block 1320, the apparatus determines that the at least one keyword is represented in the third message. In this manner, the determination that the at least one keyword is represented in the third message may be in response to the determination that the third message has an unread status. The determination may be similar as described regarding FIGS. 4A-4F.

At block 1322, the apparatus causes modification of the notification such that the notification signifies the receipt of the third message. The modification may be similar as described regarding FIGS. 4A-4F.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 504 of FIG. 5 may be performed after block 506 of FIG. 5. Furthermore, if desired, one or more of the above-described functions may be optional or may be combined. For example, block 502 of FIG. 5 may be optional and/or combined with block 504 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

The invention claimed is:
1. A method comprising:
receiving an indication of a first message;
receiving an indication of a second message;
determining that the first message has an unread status;

determining that the second message has an unread status;
determining, with at least a processor, that at least one keyword is represented in a body of the first message and a body of the second message in response to the determination that the first message has an unread status and the determination that the second message has an unread status;
generating a notification that identifies the keyword, signifies the receipt of the first message, and signifies the receipt of the second message; and
causing display of the notification on at least one display of a device.

2. The method of claim 1, further comprising:
determining that the first message is from a message sender; and
determining that the second message is from the message sender, wherein the determination that at least one keyword is represented in the body of the first message and the second message is in response to the determination that the first message is from the message sender and the determination that the second message is from the message sender.

3. The method of claim 1, further comprising determining that the second message was received within a threshold time from the receipt of the first message, wherein the determination that at least one keyword is represented in the body of the first message and the second message is in response to the determination that the second message was received within the threshold time from the receipt of the first message.

4. The method of claim 1, further comprising termination of display of the notification.

5. The method of claim 4, further comprising determining that the second message has a read status, wherein the termination of display of the notification is in response to the determination that the second message has the read status.

6. The method of claim 4, further comprising:
receiving information indicative of a message list input; and
causing display of a list of messages that comprises a first message representation indicative of the first message and a second message representation indicative of the second message, wherein the termination of display of the notification and the causation of display of the list of messages are caused by the message list input.

7. The method of claim 4, further comprising:
receiving information indicative of a message read input; and
causing display of an interface element that is configured to allow for display of the entirety of the message, wherein the termination of display of the notification is in response to the message read input.

8. The method of claim 1, further comprising:
receiving an indication of a third message; and
determining that the third message has an unread status.

9. The method of claim 8, further comprising:
determining that the at least one keyword is represented in a body of the third message in response to the determination that the third message has an unread status; and
causing modification of the notification such that the notification signifies the receipt of the third message.

10. The method of claim 8, further comprising determining that the keyword fails to be represented in a body of the third message.

11. The method of claim 10, further comprising precluding the notification from signifying the receipt of the third message based, at least in part, on the determination that the keyword fails to be represented in the body of the third message.

12. The method of claim 10, further comprising:
receiving an indication of a fourth message;
determining that the fourth message has an unread status;
determining that at least one different keyword is represented in the third message and the fourth message in response to the determination that the third message has an unread status and the determination that the fourth message has an unread status;
generating a different notification that signifies the receipt of the third message, signifies the receipt of the fourth message, and identifies the different keyword, the different notification being distinct from the notification; and
causing display of the different notification.

13. The method of claim 1, wherein the first message and the second message are of different message types, and wherein each message type comprises one of a text message type, an email type, a voice message type, a social networking message type, or an instant message type.

14. Apparatus comprising at least one processor and at least one memory, the memory comprising machine-readable instructions, that when executed cause the apparatus to:
receive an indication of a first message;
receive an indication of a second message;
determine that the first message has an unread status;
determine that the second message has an unread status;
determine that at least one keyword is represented in a body of the first message and a body of the second message in response to the determination that the first message has an unread status and the determination that the second message has an unread status;
generate a notification that identifies the keyword, signifies the receipt of the first message, and signifies the receipt of the second message; and
cause display of the notification on at least one display of a device.

15. The apparatus of claim 14, wherein the memory further comprises machine-readable instructions, that when executed cause the apparatus to:
determine that the first message is from a message sender; and
determine that the second message is from the message sender, wherein the determination that at least one keyword is represented in the body of the first message and the second message is in response to the determination that the first message is from the message sender and the determination that the second message is from the message sender.

16. The apparatus of claim 14, wherein the memory further comprises machine-readable instructions, that when executed cause the apparatus to:
determine that the second message was received within a threshold time from the receipt of the first message, wherein the determination that at least one keyword is represented by the body of the first message and the body of the second message is in response to the determination that the second message was received within the threshold time from the receipt of the first message.

17. The apparatus of claim 14, wherein the memory further comprises machine-readable instructions, that when executed cause the apparatus to:
terminate of display of the notification.

18. The apparatus of claim 17, wherein the memory further comprises machine-readable instructions, that when executed cause the apparatus to:

determine that the second message has a read status, wherein the termination of display of the notification is in response to the determination that the second message has the read status.

19. The apparatus of claim 17, wherein the memory further comprises machine-readable instructions, that when executed cause the apparatus to:

receive information indicative of a message list input; and cause display of a list of messages that comprises a first message representation indicative of the first message and a second message representation indicative of the second message, wherein the termination of display of the notification and the causation of display of the list of messages are caused by the message list input.

20. At least one non-transitory computer readable medium comprising instructions that, when executed, cause the following to be performed:

receiving an indication of a first message;

receiving an indication of a second message;

determining that the first message has an unread status;

determining that the second message has an unread status;

determining that at least one keyword is represented in a body of the first message and the a body of the second message in response to the determination that the first message has an unread status and the determination that the second message has an unread status;

determining a notification that identifies the keyword, signifies the receipt of the first message, and signifies the receipt of the second message; and causing display of the notification on at least one display of a device.

* * * * *